US007042866B2

(12) United States Patent
Famolari

(10) Patent No.: US 7,042,866 B2
(45) Date of Patent: May 9, 2006

(54) METHOD AND APPARATUS UTILIZING BLUETOOTH PROTOCOLS FOR THE REMOTE SETTING OF IP NETWORK PARAMETERS

(75) Inventor: David Famolari, Montclair, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 891 days.

(21) Appl. No.: 10/015,961

(22) Filed: Dec. 10, 2001

(65) Prior Publication Data

US 2003/0108017 A1 Jun. 12, 2003

(51) Int. Cl.
*H04Q 7/24* (2006.01)

(52) U.S. Cl. .................. 370/338; 379/59; 370/254

(58) Field of Classification Search ............... 370/338, 370/254, 252, 241.1, 236, 395.52, 331, 352–356, 370/389, 392, 395.1, 349, 469, 466, 277, 370/310; 379/59; 713/201, 100; 705/14, 705/2; 345/810, 156, 530, 594; 455/436, 455/3.01, 41, 554, 426.2, 554.1, 544.2, 444, 455/426.1, 555, 422, 435.1, 426, 41.2, 422.1; 709/217

See application file for complete search history.

(56) References Cited

U.S. PATENT DOCUMENTS

| | | | | |
|---|---|---|---|---|
| 6,590,928 | B1 * | 7/2003 | Haartsen | 375/134 |
| 6,744,753 | B1 * | 6/2004 | Heinonen et al. | 370/338 |
| 2001/0014870 | A1 * | 8/2001 | Saito et al. | 705/14 |
| 2001/0052083 | A1 * | 12/2001 | Willins et al. | 713/201 |
| 2003/0078986 | A1 * | 4/2003 | Ayres et al. | 709/217 |
| 2003/0083903 | A1 * | 5/2003 | Myers | 705/2 |
| 2003/0107605 | A1 * | 6/2003 | Iwamura | 345/810 |
| 2003/0129755 | A1 * | 7/2003 | Sadler et al. | 436/43 |
| 2004/0202132 | A1 * | 10/2004 | Heinonen et al. | 370/331 |

* cited by examiner

*Primary Examiner*—Frank Duong
*Assistant Examiner*—Jamal A. Fox
(74) *Attorney, Agent, or Firm*—Joseph Giordano; James W. Falk

(57) ABSTRACT

An efficient method and apparatus for rapidly and flexibly setting, on a remote basis, the value of a selected IP parameter(s) in each of a plurality of networked computing devices within a local proximity to support transmission using the IP protocol. In an illustrative embodiment wherein each device is connectable to a common backbone network, each device is also provided with an interface that supports radio transmission using Bluetooth protocols. The desired setting of the selected IP parameter for each device is implemented by means of a prescribed sequence of suitable Bluetooth messages transmitted by a common remote Bluetooth terminal.

17 Claims, 4 Drawing Sheets

METHOD AND APPARATUS UTILIZING BLUETOOTH PROTOCOLS FOR THE REMOTE SETTING OF IP NETWORK PARAMETERS

BACKGROUND OF THE INVENTION

This invention relates to networks of computing devices and more particularly to arrangements for remotely configuring such networks.

It is known to associate a plurality of computing devices with each other through a backbone network, and to configure the devices to implement data packet transmission through standard transmission protocols such as the Internet Protocol ("IP"). Utilizing such protocols, the devices of the network may be provided with appropriate IP addresses as well as other IP information concerning DNS addresses, default routers and so forth.

Several schemes have been employed for initially configuring the setup of the devices in such IP networks and for updating such configuration. Unfortunately, establishing and/or altering the configuration of each networked device is relatively inefficient, especially where such activities are directed from a remote location and the devices are dissimilar.

SUMMARY OF THE INVENTION

The present invention provides an efficient method and apparatus for rapidly and flexibly setting, on a remote basis, the value of a selected IP parameter(s) in each of a plurality of networked computing devices to support transmission using the IP protocol. In an illustrative embodiment wherein each device is connectable to a common backbone network, each device is also provided with an interface that supports radio transmission using Bluetooth protocols. The desired setting of the selected IP parameter for each device is implemented by means of a prescribed sequence of suitable Bluetooth messages transmitted by a common remote Bluetooth terminal, illustratively a handheld device.

In a feature of the invention applicable to the initial configuring of the devices for an IP network, the networked devices within Bluetooth range may be initially captured by the terminal through a suitable Bluetooth inquiry-response sequence. The terminal sends a suitable Bluetooth service request message to each captured device to discover at least one predetermined device characteristic that is relevant to configuring the device with a selected IP parameter for use in the IP network. The terminal then records first indications respectively indicative of the discovered characteristics of the captured devices. The terminal supports commands from a configuration command application to set the selected IP parameter of a captured device(s). The terminal responds to each such command by sending to such device an additional Bluetooth message that sets the selected IP parameter to a value that is consistent with the associated first indication.

In another feature of the invention, such technique may be adapted to update an existing IP configuration of the networked devices. In one such adaptation the terminal transmits, to each networked device to be updated, a suitable Bluetooth service request message to discover the current value or state of the selected IP parameter. The terminal then records a first indication representative of the discovered current value of such parameter. In this case, the terminal supports commands from the configuration command application to update a particular recorded first indication to a new value that corresponds to a different state of the relevant IP parameter. Upon receipt of such command, the terminal transmits to the associated device a Bluetooth message suitable to change the relevant IP parameter to the new state.

BRIEF DESCRIPTION OF THE DRAWING

These and other features, aspects and examples of the invention are further set forth in the following detailed description taken in conjunction with the appended drawing, in which.

DETAILED DESCRIPTION

Figure 1:
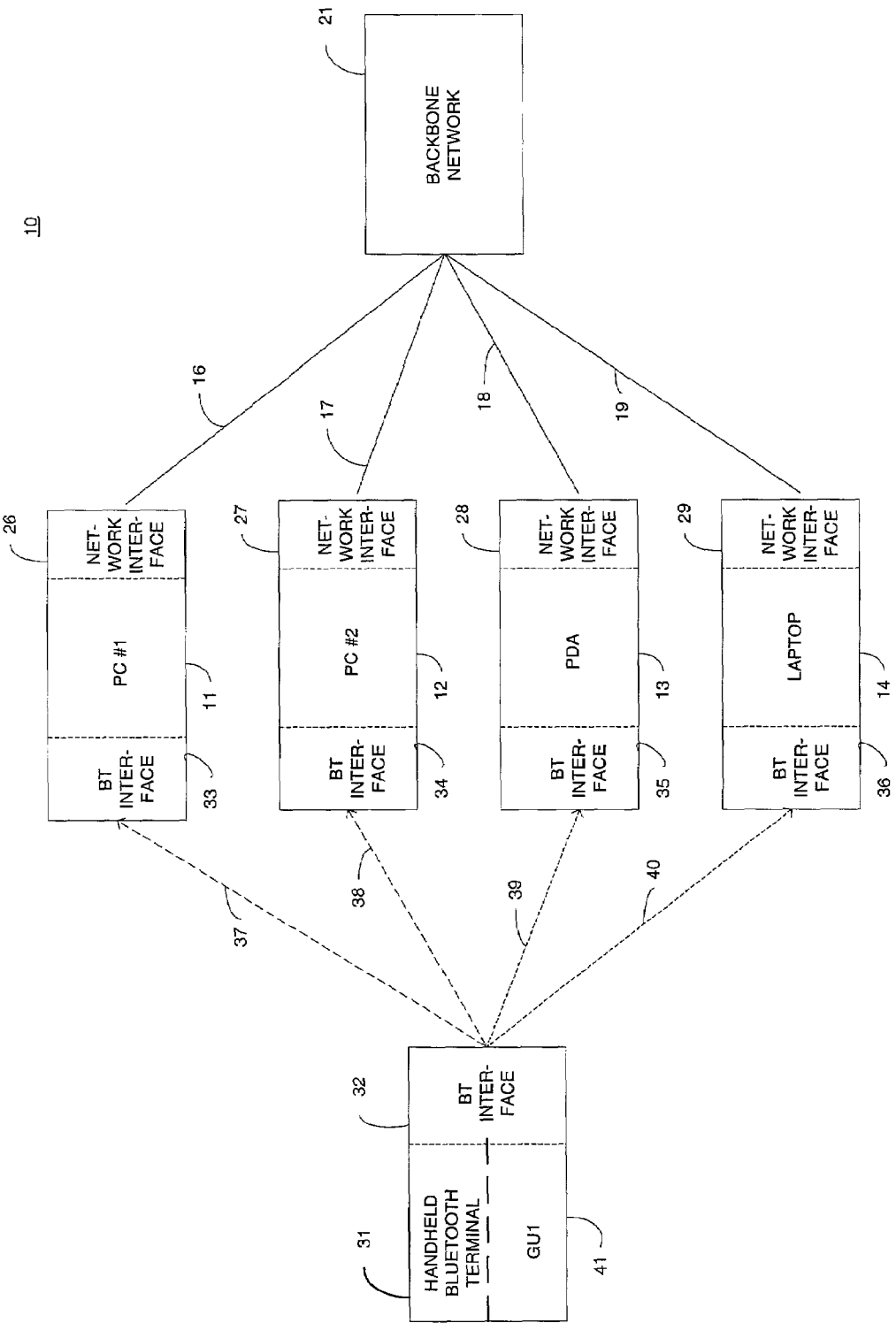
FIG. 1 is a block diagram of an arrangement of networked, Bluetooth-capable devices associated with a suitable backbone network and configurable as an IP network by an external Bluetooth terminal in accordance with the invention.

Referring now to the drawing, FIG. 1 illustrates a network 10 having a plurality of computing devices, four of which are depicted at 11, 12, 13 and 14. The devices 11–14 are in communication through links 16, 17, 18 and 19 to a conventional backbone network 21. As exemplified in FIG. 1, the devices are dissimilar; the devices 11 and 12 are each personal computers, the device 13 is a personal digital assistant, and the device 14 is a laptop computer.

The devices 11–14 are respectively provided with network interfaces 26, 27, 28 and 29 which may support hardwired connection to the backbone network 21 via the links 16–19. Alternatively, the interfaces 26–29 may support a radio transmission protocol such as IEEE 802.11, in which case the links 16–19 may encompass an intermediate radio network (not shown).

The network 10 may be adapted for packet data transmission utilizing the Internet Protocol. For this purpose, it is necessary to configure the individual devices on the network with appropriate IP parameters which are tailored to the particular characteristic(s) of each individual device. Among the IP parameters relevant to each such device may be (1) an IP address; (2) a MAC address; (3) the IP name of the device; (4) the identification of a default gateway; and (5) the identity of the DNS server. In addition, where a particular device is also adapted to operate in accordance with Bluetooth protocols as explained below, the common Bluetooth name of such device will constitute another IP parameter.

In addition to initially configuring each of the devices on the network 10 for operation in an IP network, it is also frequently necessary to alter an existing IP parameter(s) for one or more of such devices after such parameter has been set up. As noted above, it has been difficult and inefficient to program each of the devices on the network to set the associated values of the IP parameters necessary both for initial configuration set up and for altering an existing configuration.

Such difficulties in setting the IP parameters for the devices constituting such IP network may be minimized in accordance with the invention by implementing the parameter setting process with the use of a separate Bluetooth terminal, represented at 31. The terminal 31 is assumed to be located within Bluetooth range of at least the depicted devices 11–14 and is preferably a handheld device.

The terminal 31 has a radio interface 32 which is coupled to a plurality of Bluetooth interfaces 33, 34, 35 and 36 of the devices 11–14 through radio channels 37, 38, 39 and 40, respectively. The setting of a selected IP parameter of the devices 11–14 on the network 10 is illustratively accomplished by utilizing the terminal 31 to transmit a particular sequence of Bluetooth messages, described below, to the devices on the network 10 over the associated ones of the channels 37–40.

Figure 2A:
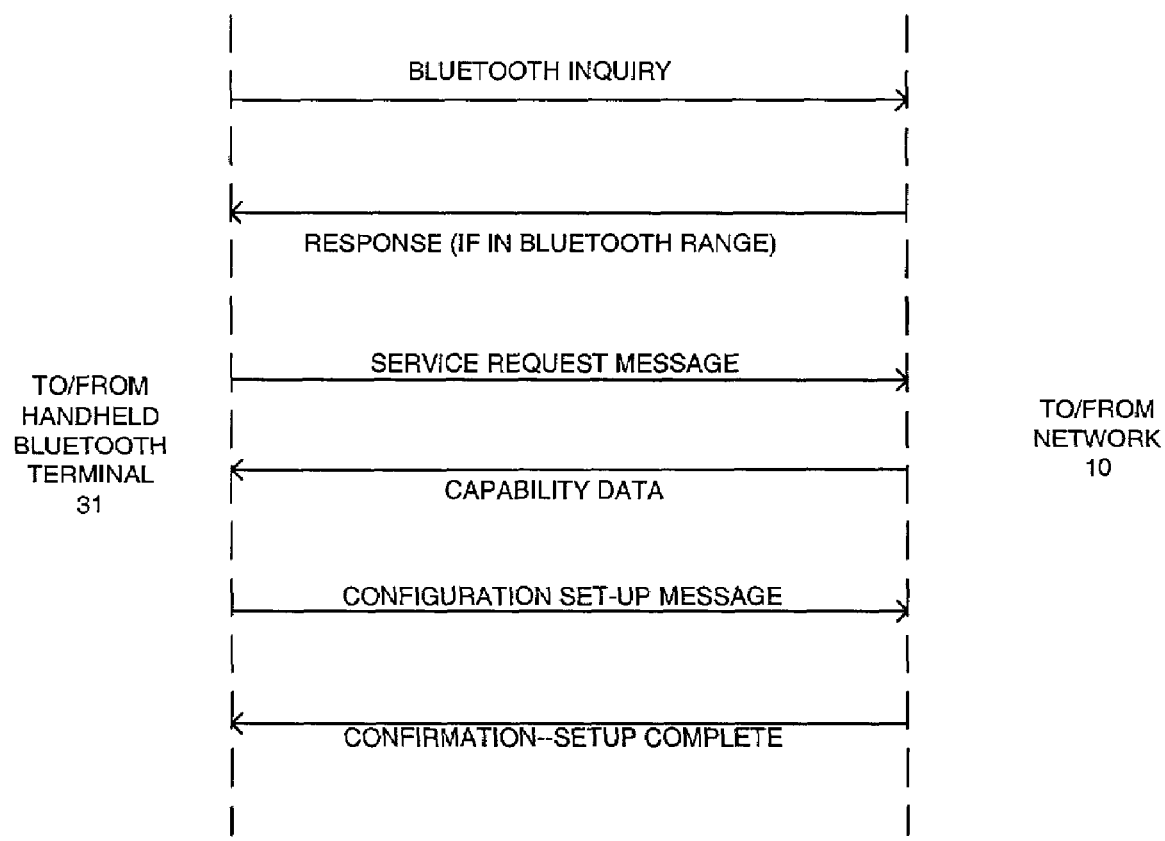
FIG. 2A is a sequence diagram of Bluetooth messages through which the IP configuration of the computing devices of the network of FIG. 1 may be set up.

One illustrative manner by which the Bluetooth terminal 31 may be so employed to set a selected IP parameter (e.g., the IP address) on one or more of the devices 11–14 during an IP configuration set-up mode is described in connection with FIGS. 1 and 2A. Initially, the terminal 31 transmits a conventional Bluetooth inquiry to elicit responses from those devices on the network 10 (including the devices 11–14) that are within Bluetooth range of the terminal 31. Upon receipt of such responses from the devices 11–14, the terminal establishes the Bluetooth connections 37–40.

The terminal 31 sends to each of the so-responding devices a suitable Bluetooth service request message which seeks to discover, from each of such devices, at least one characteristic of the device which has relevance to the selected IP parameter to be configured. In the assumed case where such parameter is the IP address of the device, such characteristic may illustratively be the number of interfaces on such device.

Each device receiving such service request message from the terminal 31 responds with a return message that contains the requested information on the number of interfaces. Upon receipt of such return message, the terminal 31 generates a first indication representative of the discovered number of interfaces on the corresponding device. Each such first indication may be recorded on a graphical user interface ("GUI") 41 in the terminal 31.

The GUI 41 is coupled to a configuration command application (not shown) through which the terminal 31 may be instructed by suitable commands to set the IP address of one or more of the devices 11–14, illustratively the device 11. The terminal 31 suitably processes such commands to generate an additional Bluetooth message constituting a configuration set-up message. Such message is in a form suitable for setting the IP address of the device 11 in a manner consistent with the recorded first indicia for such device and therefore with the discovered number of interfaces of such device. The device 11 responds to such message by exhibiting the IP address dictated by the message. Once such IP address is set up, the device may send a confirmation message back to the terminal 31.

Figure 2B:
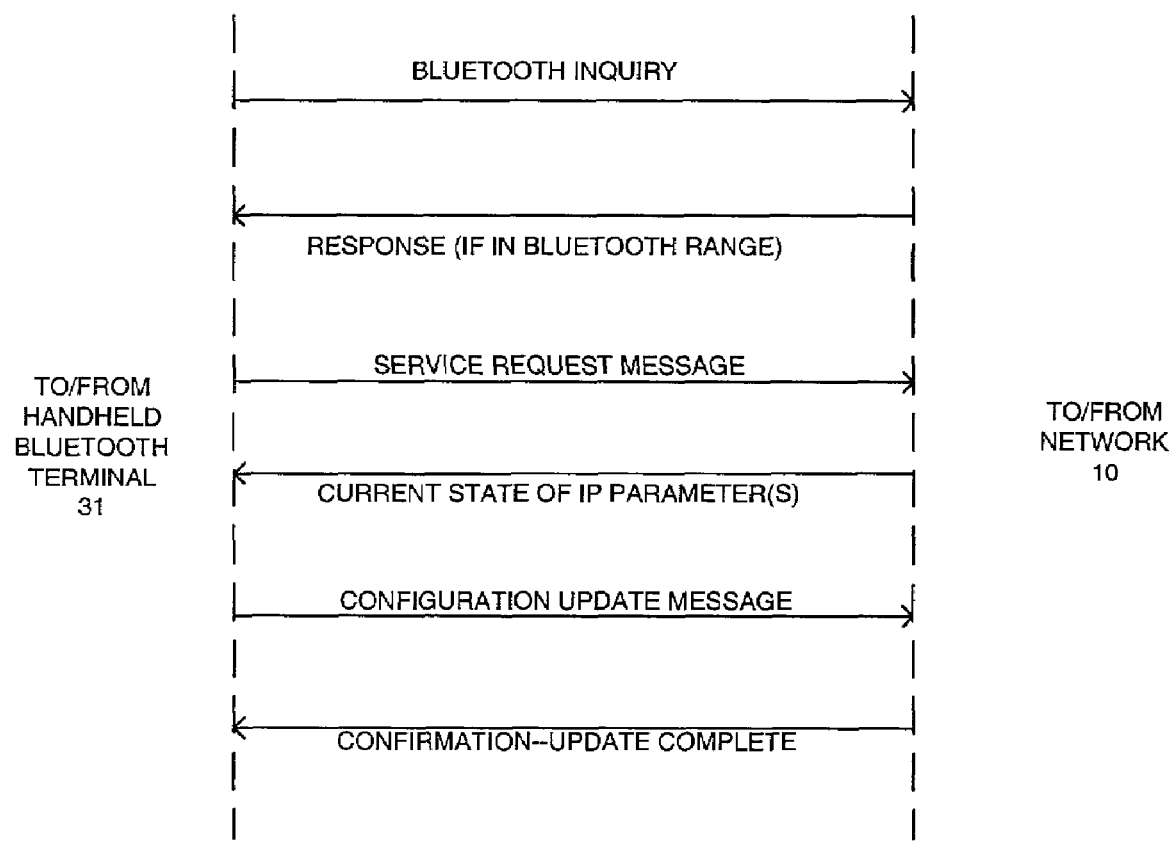
FIG. 2B is a sequence diagram of Bluetooth messages that may be employed to alter an existing IP configuration of a computing device in the network of FIG. 1.

In another aspect of the invention, an existing IP configuration of the devices on the network 10 may be updated by the terminal 31 with the use of a modified sequence of Bluetooth messages. The implementation of such technique for altering an existing configuration of the network 10 will now be described in connection with FIGS. 1 and 2B. As in the configuration set-up mode just described, the terminal 31 initially captures the devices of the network 10 within Bluetooth range via channels 37–40. Once such Bluetooth connections are established, the terminal 31 sends a suitable Bluetooth service request message to each of the captured devices 11–14 to discover the current state of the selected IP parameter, which will again be assumed to be the current IP addresses of the devices.

Each of the devices 11–14 responds to such service request message by sending a suitable response message indicating the current IP address of such device. The terminal generates a first indication representative of such address, and such first indication is recorded on the GUI 41. In response to a command from the application directing a specified update of the current IP address of at least one of such devices (e.g., the device 11) the GUI 41 correspondingly updates the relevant first indication.

Such update of the first indication, in turn, causes the terminal 31 to generate a Bluetooth configuration update message consistent with the update command from the application. The update message is then applied by the terminal 31 over the relevant Bluetooth channel 37 to the device 11 to cause such device to correspondingly set the updated IP address. Once this is done, the device 11 may send an confirmation message to this effect back to the terminal 31.

It will be appreciated that the above-described techniques for establishing and/or updating an IP parameter for the device 11 may be repeated for each of the other devices on the network 10.

Figure 3:
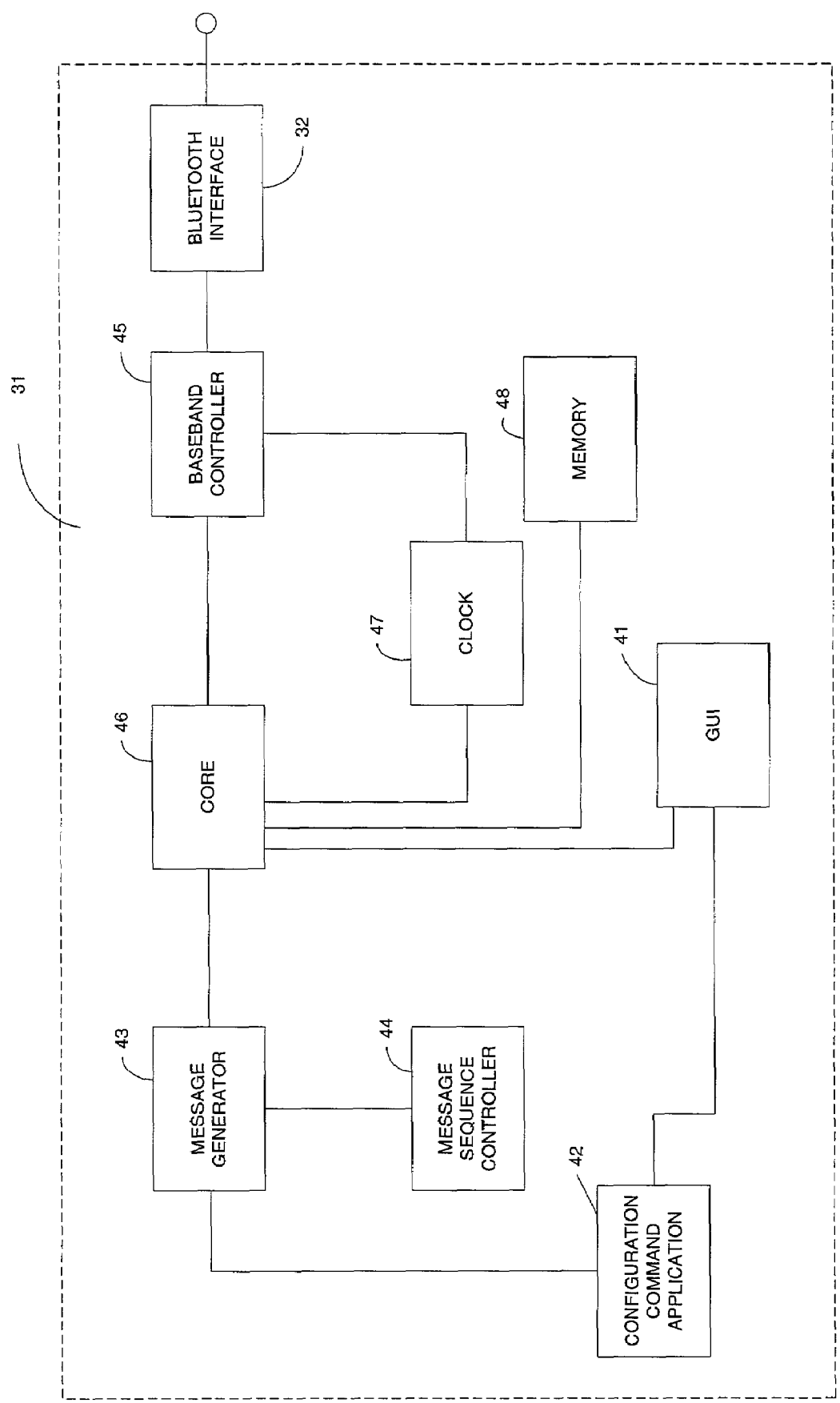
FIG. 3 is a block diagram of one embodiment of a Bluetooth terminal which may be utilized to implement the Bluetooth messages contemplated in FIGS. 2A and 2B.

An illustrative embodiment of the Bluetooth terminal 31 is indicated in FIG. 3. The terminal includes a configuration command application 42 by which the terminal may set the desired IP parameter values for the respective devices 11–14. The above-described Bluetooth messages are created in a suitable generator 43. The application 42 is suitably coupled to the generator 43 so that desired values of relevant IP parameters for the several devices on the network 10 may be reflected in the appropriate ones of the messages from the generator 43. A message sequence controller 44 is also coupled to the generator 43 to establish the appropriate sequence of messages depicted in FIGS. 2A and 2B, respectively.

Such messages are converted into suitable Bluetooth transmission format with the aid of a conventional baseband controller 45 which is coupled to the generator 43 through a CPU core 46. The core 46 is in turn associated with a system clock 47 and memory 48, with the clock 47 being used to establish time slots for Bluetooth frequency hopping patterns from the baseband controller 45 in a conventional manner. The core 46 is also coupled to the GUI 41 to permit the recording and display of the above-mentioned indications representative of (1) discovered values of the device characteristics for the configuration set-up mode, or discovered values of the initially set IP parameter for the configuration update mode, as the case may be; and (2) the desired values for such parameters as dictated by commands from the application 42.

In a conventional manner, the output of the baseband controller 45 is applied through the Bluetooth interface 32 to modulate the carrier frequency of a suitable Bluetooth radio module (not shown). Such module establishes the several Bluetooth channels with the network 10, including the channels 37–40 specifically depicted in FIG. 1.

In the foregoing, the invention as been described in connection with several embodiments thereof. Many variations and modifications will now occur to those skilled in art. For example, while the IP configuration technique of the invention has been explained in connection with the set-up of one IP parameter, such technique may be applied to any and all additional IP parameters that are associated with a particular IP network application. Also, while for clarity of description the technique of the invention has been applied to set the IP parameters for a network containing four computing devices, it will be appreciated that such technique may be used for configuring networks that contain any reasonable number of such devices. It is accordingly desired that the scope of the appended claims not be limited to or by the specific disclosure herein contained.

What is claimed is:

1. A method of configuring an IP network containing a plurality of computing devices each connectable to a backbone network, each device having a first interface for establishing a Bluetooth connection, the method comprising the steps of:

transmitting to each device, through its first interface, a first Bluetooth message suitable for discovering at least one network-relevant characteristic of the device;

recording first indicia respectively indicative of the discovered characteristic for each device;

generating, for each device, a second Bluetooth message representing a selectable value of at least one IP parameter with which the device may be configured, the second Bluetooth message being in a form suitable for commanding the associated device to correspondingly set the associated IP parameter;

selecting the value of the IP parameter for each device consistent with the recorded first indicia for such device; and transmitting each second Bluetooth message to the associated device through its first interface.

2. A method as defined in claim 1, in which the steps of the method are executed with a hand-held Bluetooth terminal.

3. A method as defined in claim 1, in which the IP parameter is the IP address of the associated device.

4. A method as defined in claim 1, in which the IP parameter is the MAC address of the associated device.

5. A method as defined in claim 1, in which the IP parameter is the IP name of the associated device.

6. A method as defined in claim 1, in which the IP parameter is the common Bluetooth name of the associated device.

7. A method as defined in claim 1, in which the IP parameter is the identity of a default gateway.

8. A method as defined in claim 1, in which the IP parameter is the location of a DNS server.

9. A method of configuring an IP network containing a first plurality of computing devices each connectable to a backbone network, each device having a first interface for establishing a Bluetooth connection, the method comprising the steps of:

transmitting to each device, through its first interface, a first Bluetooth message suitable for discovering at least one network-relevant characteristic of the device;

recording first indicia indicative of the discovered characteristic for each of the devices;

generating second indicia indicative of a selectable value of at least one IP parameter with which each device may be configured, selecting the second indicia for each device consistent with the recorded first indicia for such device;

generating, for each device, a second Bluetooth message reflecting the corresponding second indicia, the second Bluetooth message being in a form suitable for commanding the associated device to correspondingly set the associated IP parameter; and transmitting each second Bluetooth message to the associated device through its first interface.

10. A method as defined in claim 9, in which the first plurality of devices form part of a larger second plurality of devices each having the first and second interfaces, and in which the method further comprises the step, prior to the first Bluetooth message transmitting step, of interrogating the second plurality of devices with a Bluetooth inquiry to seek responses from devices within Bluetooth range, whereby only the first plurality of devices respond to such inquiry.

11. A method as defined in claim 9, in which the IP parameter is the IP address of the associated device.

12. A method as defined in claim 9, in which the IP parameter is the MAC address of the associated device.

13. A method as defined in claim 9, in which the IP parameter is the IP name of the associated device.

14. A method as defined in claim 9 in which the IP parameter is the common Bluetooth name of the associated device.

15. A method as defined in claim 9, in which the IP parameter is the identity of a default gateway.

16. A method as defined in claim 9, in which the IP parameter is the location of a DNS server.

17. For use in updating the configuration of an IP network containing a plurality of computing devices each connectable to a backbone network, each device having a first interface for establishing a Bluetooth connection, a Bluetooth terminal which comprises:

means for transmitting to each device, through its first interface, a first Bluetooth message suitable for discovering the current state of at least one preselected IP parameter with which such device may be configured;

means for recording first indicia respectively indicative of the discovered current state of the IP parameter for each device;

means for selecting a desired state of the IP parameter for at least a first one of the devices;

means responsive to the selecting means for updating the first indicia for the first device to reflect the desired state of the corresponding IP parameter;

means responsive to the updating means for generating a second Bluetooth message suitable for commanding the first device to alter the relevant IP parameter consistent with the updating of the corresponding first indicia; and means for transmitting the second Bluetooth message to the first device through its first interface.

* * * * *

UNITED STATES PATENT AND TRADEMARK OFFICE
CERTIFICATE OF CORRECTION

PATENT NO. : 7,042,866 B2  
APPLICATION NO. : 10/015961  
DATED : May 9, 2006  
INVENTOR(S) : Famolari Page 1 of 1

It is certified that error appears in the above-identified patent and that said Letters Patent is hereby corrected as shown below:

In the Specification

In Column 2, Line 5, delete "DRAWING" and insert -- DRAWINGS --, therefor.

In Column 2, Line 9, delete "drawing," and insert -- drawings, --, therefor.

In Column 2, Line 28, delete "drawing," and insert -- drawings, --, therefor.

In the Claims

In Column 6, Line 24, in Claim 14, delete "claim 9" and insert -- claim 9, --, therefor.

Signed and Sealed this
Eleventh Day of November, 2014

Michelle K. Lee
*Deputy Director of the United States Patent and Trademark Office*